US00RE38052E

(19) United States
(12) Reissued Patent
Kluth

(10) Patent Number: US RE38,052 E
(45) Date of Reissued Patent: Apr. 1, 2003

(54) SENSING APPARATUS FOR SENSING PRESSURE OR TEMPERATURE IN OIL WELLS, INCLUDING TRANSMITTER RELAYING PRESSURE OR TEMPERATURE INFORMATION TO A REMOTE CONTROL POINT

(75) Inventor: Erhard Lothar Edgar Kluth, Hampshire (GB)

(73) Assignee: Sensor Dynamics, Limited (GB)

(21) Appl. No.: 09/209,176

(22) PCT Filed: Apr. 30, 1993

(86) PCT No.: PCT/GB93/00907

§ 371 (c)(1),
(2), (4) Date: Jan. 17, 1995

(87) PCT Pub. No.: WO93/22645

PCT Pub. Date: Nov. 11, 1993

Related U.S. Patent Documents

Reissue of:
(64) Patent No.: 5,582,064
Issued: Dec. 10, 1996
Appl. No.: 08/318,704
Filed: Apr. 30, 1993

(30) Foreign Application Priority Data

May 1, 1992 (GB) ..... 9209434

(51) Int. Cl.[7] ..... G01L 27/00; E21B 47/026; E21B 47/06; E21B 49/00

(52) U.S. Cl. ..... 73/1.57; 73/152.51; 175/50; 166/73

(58) Field of Search ..... 73/1.57, 4 R, 151, 73/152, 701, 706, 708, 714, 715; 175/50; 166/66

(56) References Cited

U.S. PATENT DOCUMENTS

| | | | | | |
|---|---|---|---|---|---|
| 2,315,355 | A | * | 3/1943 | Scherbatskoy | 175/50 |
| 3,817,328 | A | | 6/1974 | Neuman | |
| 3,895,527 | A | * | 7/1975 | McArthur | 73/151 |
| 4,052,903 | A | * | 10/1977 | Thordarson | 73/406 |
| 4,375,239 | A | | 3/1983 | Barrington | |
| 4,389,645 | A | | 6/1983 | Wharton | |
| 4,577,693 | A | | 3/1986 | Graser | |
| 4,712,430 | A | * | 12/1987 | Wareham | 73/706 |
| 4,756,510 | A | | 7/1988 | Klamm | |
| 4,778,248 | A | | 10/1988 | Arzur | |
| 4,782,695 | A | | 11/1988 | Glotin | |
| 5,163,321 | A | * | 11/1992 | Perales | 763/151 |
| 5,199,689 | A | | 4/1993 | Proud | |
| 5,329,811 | A | | 7/1994 | Schultz | |
| 5,361,313 | A | | 11/1994 | O'Keefe | |

FOREIGN PATENT DOCUMENTS

| | | |
|---|---|---|
| GB | 947104 | 1/1964 |
| JP | 3-249705 | 11/1991 |

* cited by examiner

*Primary Examiner*—William Oen
(74) *Attorney, Agent, or Firm*—Trop, Pruner & Hu, P.C.

(57) ABSTRACT

The invention is an apparatus for measuring pressure, which comprises a pressure communicating device (3) for location at a point (4) at which pressure is to be measured, a primary tube (1) containing a fluid for linking the pressure communicating device (3) to a control point (9) where the pressure information is required, a sealing device for sealing the primary tube (1) so as to form a closed system when the pressure communicating device (3) is closed, a pressure control device (6) for changing the pressure of the fluid within the primary tube (1), a volume measuring device (8) for measuring changes in the volume of the fluid within the primary tube (1) as the pressure of the fluid is varied, a pressure measuring device (7) for measuring the pressure of the fluid at some point within the fluid, and device remote from the control point (9), and a transmitter device for transmitting pressure information from the pressure measuring device to the control point (9).

34 Claims, 5 Drawing Sheets

(Amended)

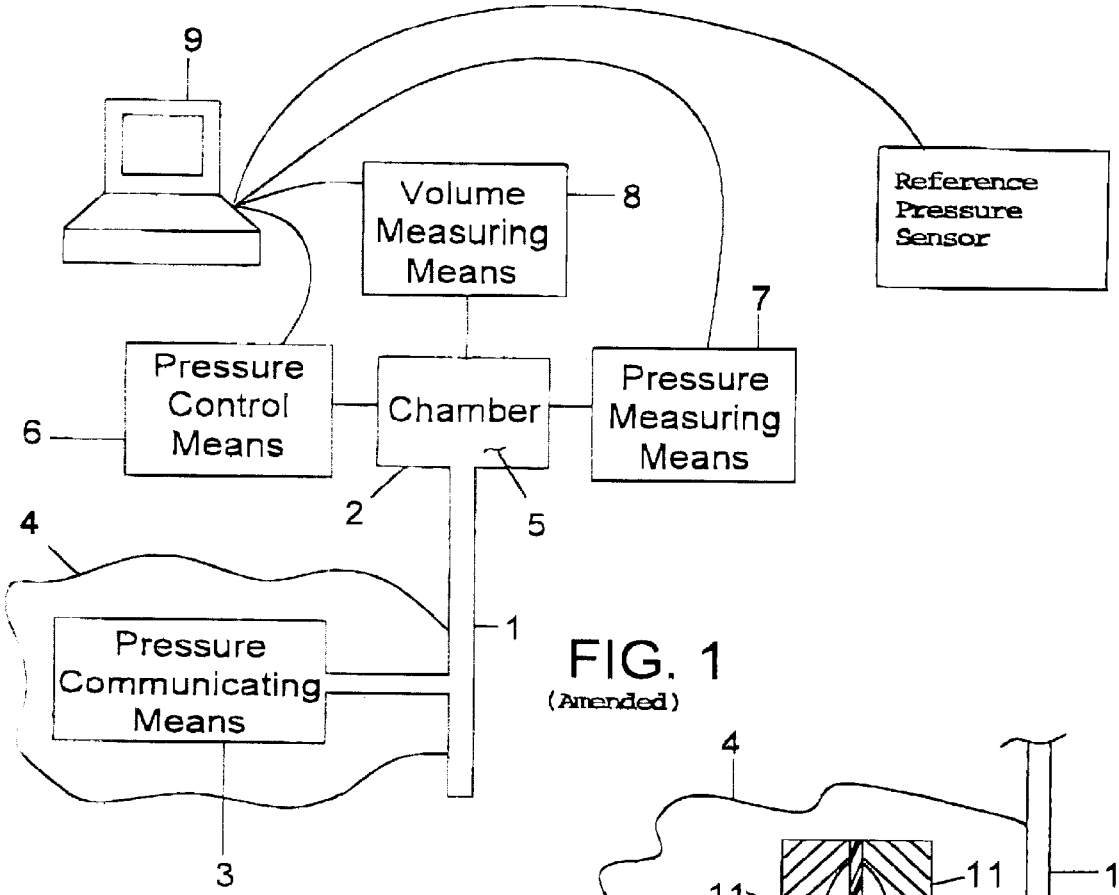
FIG. 1
(Amended)
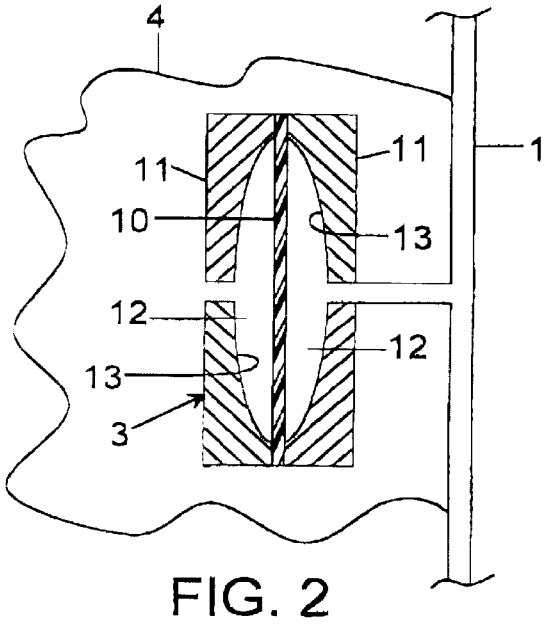
FIG. 2
(Amended)

SENSING APPARATUS FOR SENSING PRESSURE OR TEMPERATURE IN OIL WELLS, INCLUDING TRANSMITTER RELAYING PRESSURE OR TEMPERATURE INFORMATION TO A REMOTE CONTROL POINT

Matter enclosed in heavy brackets [ ] appears in the original patent but forms no part of this reissue specification; matter printed in italics indicates the additions made by reissue.

*CROSS REFERENCE TO RELATED APPLICATIONS*

*This application claims priority to PCT Patent Application No. PCT/GB93/00907, filed Apr. 30, 1993, which in turn claims priority to United Kingdom Patent Application No. 9209434, filed May 1, 1992.*

FIELD OF THE INVENTION

In many instances, it is necessary to measure a physical parameter at some point in a harsh environment, often a considerable distance from where the information is needed. Such an example is the measurement of pressure at the bottom of an oil well which presents significant problems for the deployment of pressure sensors.

BACKGROUND OF THE INVENTION

There are three main problems associated with the deployment of sensors in harsh environments. Firstly, there are the practical difficulties in getting the sensor to the correct position in the first instance and then, possibly, retrieving it later. Secondly, either the sensor must have a means of storing information, or it must have a means of communicating between the sensor itself and the information processing system. Thirdly, the sensor must be robust enough, not only to take the rigours of deployment, but also be able to function successfully for significant periods of time under harsh conditions. These three aspects are of particular importance in the oil extraction industry. The measurement of pressure at the bottom of an oil well is important for the efficient extraction of the oil reserves. The industry takes two different approaches. In the one case, a measurement system is lowered down the production tube of the well to take and record measurements for a short period before being returned to the surface. Although convenient for use with existing wells and only requiring short term stability of calibration, this approach gives limited information and interferes with the production of oil. In the other case, a measurement system is permanently installed during the construction of the oil well. This has the advantage of giving continuous measurements without interfering with oil production but places very severe requirements on the measurement stability of the sensor and its ability to withstand the high pressures and temperatures in the well for many years. Should such a sensor fail, or doubts be cast upon its accuracy, then the current practice would be to abandon it since it would be too expensive to replace. The permanent installation of a measurement system at the bottom of the oil well also requires significant technical problems to be solved in transferring information via metal or optical fiber cables, or radio links, up to the surface.

The present invention describes a pressure sensor which may be either temporarily or permanently deployed in a convenient fashion, using existing technology familiar to industries such as the oil industry.

SUMMARY OF THE INVENTION

An aim of the present invention is to provide apparatus for the measurement in a hostile environment preferably at a remote location.

BRIEF DESCRIPTION OF THE INVENTION

According to the present invention there is provided apparatus for measuring pressure, which apparatus comprises pressure communicating means for location at a point at which pressure is to be measured, a primary tube containing a fluid for linking the pressure communicating means to a control point where the pressure information is required, sealing means for sealing the primary tube so as to form a closed system when the pressure communicating means is closed, pressure control means for changing the pressure of the fluid within the primary tube, volume measuring means for measuring changes in the volume of the fluid within the primary tube as the pressure of the fluid is varied, pressure measuring means for measuring the pressure of the fluid at some point within the fluid, and remote from the control point, and transmitter means for transmitting pressure information from the pressure measuring means to the control point.

The pressure communicating means may be a device which may exist in a number of states according to the relative pressure difference between an external and an internal pressure, and whose volume depends upon this pressure difference. The external pressure is that which surrounds the pressure communicating means and is usually the pressure to be measured. The internal pressure is that of the fluid contained in the primary tube at the point of connection between the pressure communicating means and the primary tube. When the external pressure is higher than the internal pressure by more than a fixed limit, the pressure communicating means contains a fixed volume of the primary tube fluid which constitutes one state, the OFF state. Similarly; when the external pressure is lower than the internal pressure by more than a different fixed limit, the pressure communicating means contains a different fixed volume of the primary tube fluid, which constitutes a second state, the ON state. A third state, the ACTIVE state, occurs when the external pressure lies between these fixed pressure limits relative to the internal pressure. In which case, the volume of primary tube liquid contained by the communicating means depends upon the pressure difference in some consistent fashion and lies between the two volume limits. When the pressure communicating means takes this form, the whole apparatus is a sealed system with no direct contact between the fluid in the primary tube and the external environment.

Alternatively, the pressure communicating means may be a device which may exist in a number of states according to a control signal provided separately. In addition, the pressure communicating means may not contain a mechanical interface between the pressure in the primary tube and that in the region to be measured, and so there will be direct contact between the fluid in the primary tube and the external environment when the pressure valve is in the ACTIVE state.

The primary tube may be preferably narrow bore hydraulic tubing whose change in dimension with pressure is either small or well-known. The fluid contained by the primary tube may be a hydraulic oil, or any other fluid that is virtually incompressible or whose compressibility is well-known.

The sealing means may take any form that ensures that at all times the pressure within the primary tube may be adequately controlled both in accuracy and range. In particular, the pressure in the primary tube must be able to match the pressure to be found in the external environment to be measured, so that the pressure communicating means may operate as intended and the pressure be measurable.

The pressure control means may be any apparatus which permits the pressure to be changed from one value to another under some external control. Such apparatus could be a force acting on a piston inside a cylinder containing the-primary tube fluid.

The pressure measuring means may be any convenient apparatus which converts pressure into an indication such as a pressure dial gauge or a pressure transducer.

The volume measuring means may be any apparatus suitable for measuring the change in volume of the fluid within the primary tube and which has the sensitivity to detect the change in volume of the pressure communicating means as it changes state. An example of such apparatus would be the measurement of the position of a piston in a cylinder where the piston is used to determine the pressure in the primary tube fluid.

In one embodiment of the present invention, the means of changing the pressure, the volume measuring means, and the pressure measuring means, are all located together at the control point.

In a preferred embodiment of the apparatus, there is also provided means of measuring the temperature along the length of the primary tube. The temperature measuring means may be preferably an optical fiber distributed temperature sensor, either outside or inside the primary tube. An example of such a sensor is the York Sensors Limited DTS80 which is commercially available.

In another preferred embodiment of the apparatus, there is also provided pressure sensing means of such a dimension and structure that it it is placeable inside the primary tube, locating means for locating the pressure sensing means at any desired point within the primary tube, and transmitter means for transmitting the pressure information from the pressure sensing means to the control point. More preferably there is also provided means for removing the pressure sensing means. The pressure sensing means may be a passive optical fiber sensor and the transmitter means may be optical fiber cables. More preferably, the pressure-sensing means may be a passive optical fiber sensor such as the polarimetric interferometer optical fiber pressure and temperature sensor disclosed in PCT patent application No. PCT/GB/93/00315.

A further embodiment includes a secondary tube which connects the furthest point at which a pressure sensor may be located in the primary tube to the control point so that a return path for the fluid in the primary tube is provided. It is then possible to locate the pressure sensor by means of controlling the flow of fluid through the primary and secondary tubes, by, for example, a pump with the capability of reversible flow.

During operation, the pressure of the fluid in the primary tube is increased, and the volume monitored, until there is a change in volume equivalent to the change of a pressure valve from the OFF state to the ON state. The pressure is then held constant in the ACTIVE state between the two volume limits by the pressure control means at some defined point, preferably the mid-point. The pressure at the pressure communicating means may then be computed from (a) the measured pressure obtained from the pressure sensing means, (b) the physical separation of the location of the pressure communicating means and the point at which the pressure is measured using the effect of gravity on hydrostatic pressure and the effect of temperature upon density of the fluid, and (c) any residual correction needed to compensate for any pressure loss caused by activation of the pressure communicating means. In general, it is desirable to locate the pressure sensing means close to the pressure communicating means in order to minimize the required correction to the measured pressure. In order for the volume change arising from the change in states of the pressure communicating means to be detected, it is necessary for the compressibility of the fluid in the primary tube to be low or well-known, and for the change in volume of the primary tube and the connected volumes with pressure to be small or well-known.

If P(h) and p(h,T) are the pressure and density respectively, at height h and temperature T, then the pressures at two different heights a and b are related by well-known theory as follows:

$$P(a) = P(b) - g\int_a^b p(h, T)dh$$

where g is the gravitational constant.

Thus, in order to be able to compute the pressure at one height from measurements made at another, it is necessary to know the height difference as well as the density of the fluid as a function of height. Where the temperature of the fluid is approximately constant, sufficient accuracy may be achieved simply by assuming a uniform density of the liquid. However, where large changes in temperature occur, and where maximum accuracy is required, it will be necessary to measure the temperature of the fluid as a function of height and or minimize the height difference between the height at which the pressure is required and the height at which it is measured.

If the pressure difference between that pressure needed to put the pressure communicating means into the OFF state and that pressure needed to put it into the ON state is known, then it will be possible to calibrate the pressure sensitivity system by varying the pressure from the one state to the other and noting the volume change. This calibration may be then used to convert a measured volume change into a calculated pressure change when the pressure communicating means is held in the active region.

In another preferred embodiment, there are provided additional pressure communicating means connected at different points along the primary tube, and distinguishing means for distinguishing the state of a particular pressure communicating means as the pressure is changed. Such distinguishing means may be implicit, such as, for example, when the pressure communicating means are used to measure the pressure at a variety of different heights and where the pressure is known to be strongly correlated with height, then identical pressure communicating means may be used and the point at which the pressure is being measured deduced from the sequence of volume changes with pressure change. Another example where the distinguishing means are implicit is when pressure communicating means of different volumes are used so that the communicating means is uniquely identified by its volume change as the pressure is varied. For example, each pressure communicating means having twice the volume of its predecessor along the primary tube would be suitable.

In one preferred embodiment, there is provided one or more pressure sensing means located at each pressure communicating means so that it is not necessary to take into account the position of the pressure valve by computing a correction.

In another embodiment, there are provided more than one pressure sensing means positioned at different locations as convenient, but not necessarily adjacent to a pressure communicating means. For example, the temperature at a pressure valve may be too high to permit the location of the pressure sensing means at that point. However, a pressure sensing means at the control point may not be able to provide suitable response to rate of change in pressure at the pressure communicating means because the primary tube is of such a bore and such a length that its impedance restricts the rate of change in pressure. In which case, it would be advantageous to position a pressure sensing means at some intermediate point in the primary tube between the pressure communicating means and the control point.

In another embodiment the pressure communicating means is operated by separate means, either hydraulic or electric, so that the state of the communicating means may be controlled at will. This may be advantageous for both safety and operational purposes, but does require additional equipment. In addition, there may be no mechanical interface between the fluid in the primary tube and that in the external region to be measured when the pressure communicating means is in the ACTIVE state. This has the advantage that the properties of such an interface do not affect the pressure measurement, but has the disadvantage that there may be loss of fluid from the primary tube. If this were to occur then there would need to be provided means of ensuring that there was sufficient fluid available in the apparatus at all times for satisfactory performance.

BRIEF DESCRIPTION OF THE DRAWINGS

Embodiments of the invention will now be described solely by way of example and with reference to the accompanying drawings in which:

FIG. 1 is a diagram of a pressure sensor according to the present invention;

FIG. 2 is a diagram of a suitable pressure communicating means;

DETAILED DESCRIPTION OF THE INVENTION

Figure 3:
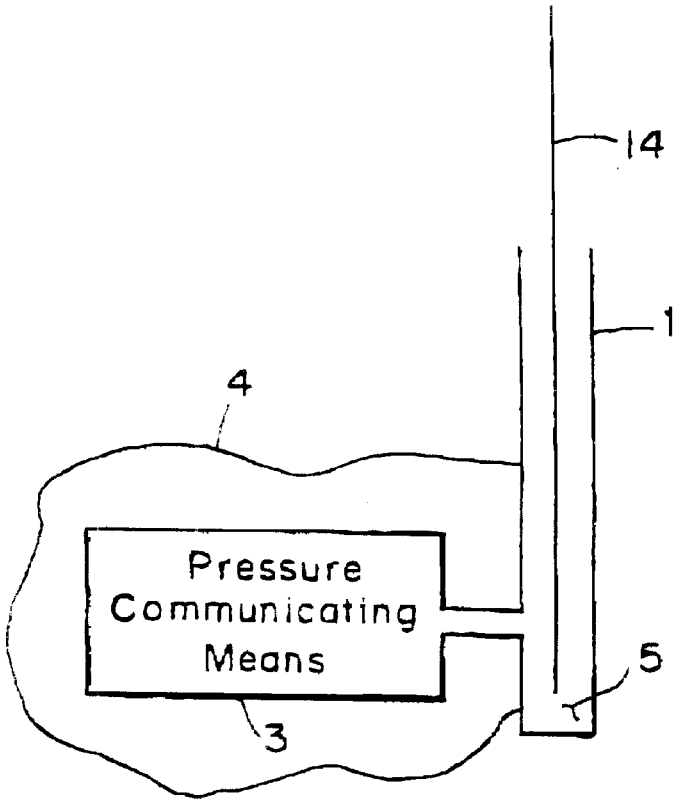
FIG. 3 is a diagram of part of a preferred embodiment of the present invention, in which an optical fiber distributed temperature sensor is included.

With reference to FIG. 1, a primary tube 1 is connected at one end to a chamber 2 and at the other end to a pressure communicating means 3 which is situated in region 4 whose pressure is to be measured. The primary tube 1, chamber 2, and communicating means 3, constitute a single connected volume and is filled with hydraulic oil 5, or some other virtually incompressible fluid, or one whose compressibility is well-known. The pressure in the chamber 2 is controlled by pressure control means 6, and is measured by pressure measuring means 7. The volume of the hydraulic oil 5 is measured by volume measuring means 8. Computing and controlling means 9 is used to change the pressure in the chamber 2 with the pressure control means 6 until a change in volume, caused by the pressure communicating means 3 changing state, is detected by the volume measuring means 8. Computing and controlling means 9 is then used to compute the pressure in region 4 from the pressure in chamber 2 obtained from the pressure measuring means 7, and the known height difference between the pressure communicating means 3 and chamber 2, and the known density of the hydraulic oil 5.

FIG. 2 illustrates an example of a suitable pressure communicating means 3 connected to primary tube 1. A membrane 10 is clamped between two blocks 11 so as to form two isolated volumes 12, on either side of the membrane, where one volume is exposed to the pressure in the region to be measured 4, and the other volume is exposed to the pressure in the primary tube 1. The inner surfaces 13 of the blocks 11 are such that, once the pressure on one side of the membrane 10 exceeds that on the other side by some threshold value, the membrane 10 will be constrained by the surface 13 so that there is little further change in volume as the pressure difference increases. The change in volume as the membrane 10 moves from one surface 13 to the other is sufficient to be detected by the volume measuring means 8 shown in FIG. 1.

FIG. 3 shows a preferred embodiment of the apparatus in which the temperature of the hydraulic oil 5 is measured along the length of the primary tube 1 between the pressure communicating means 3 and the chamber 2 (not shown in this Figure) using the sensing optical fiber 14 of a distributed temperature sensing measurement system. Computing and controlling means 9 (not shown in this Figure) is further used to derive the pressure difference between the pressure communicating means 3 and chamber 2 (not shown in this figure) from the known density of the hydraulic oil 5 as a function of temperature.

Figure 4:
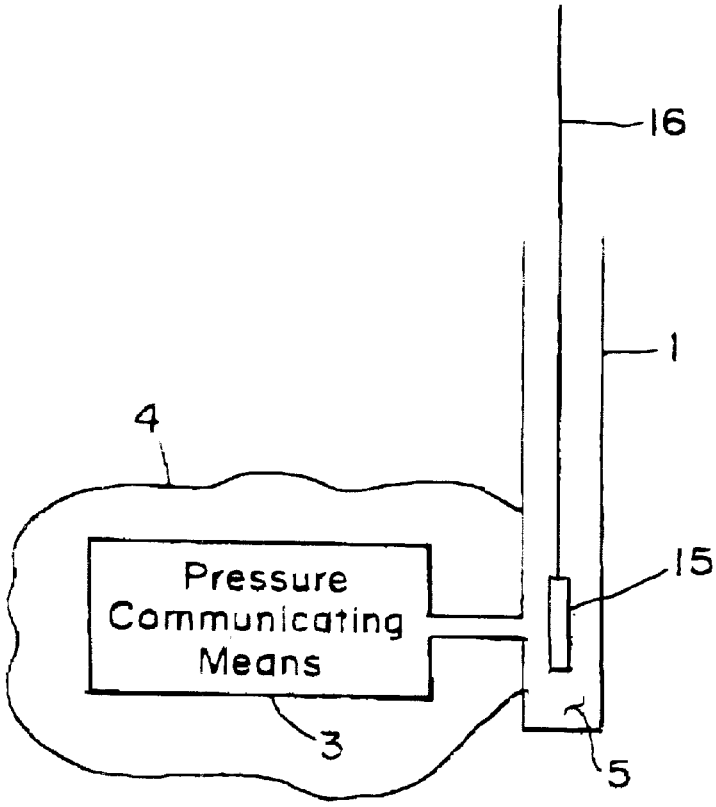
FIG. 4 is a diagram of part of a preferred embodiment of the present invention, in which an optical fiber pressure sensor is included.

FIG. 4 shows a preferred embodiment in which pressure sensing means 15 is placed inside the primary tube 1 close to the pressure communicating means 3. The pressure sensing means 15 may be additional to, or replace, the pressure measuring means 7 shown in FIG. 1. The measured pressure information is transmitted from the pressure sensing means 15 to the computing and controlling means 9 (not shown in this figure) by a metal or optical fiber cable 16.

The pressure sensing means 15 may be operated in two different modes. In the first mode, when the pressure communicating means 3 is in the ACTIVE state, pressure sensing means 15 is measuring the pressure of an external region 4, and, in the second mode, when the pressure communicating means 3 is in the ON or OFF state, pressure sensing means 15 is measuring the pressure determined by the pressure at the control point plus the hydrostatic pressure of the column of fluid 5 in the primary tube 1 independently of the pressure in region 4. This permits the checking, conditioning and determination of a variety of performance parameters of the pressure sensing means 15, such as sensitivity and repeatability, without the need to remove the pressure sensing means 15 from primary tube 1, which is particularly advantageous.

Figure 5:
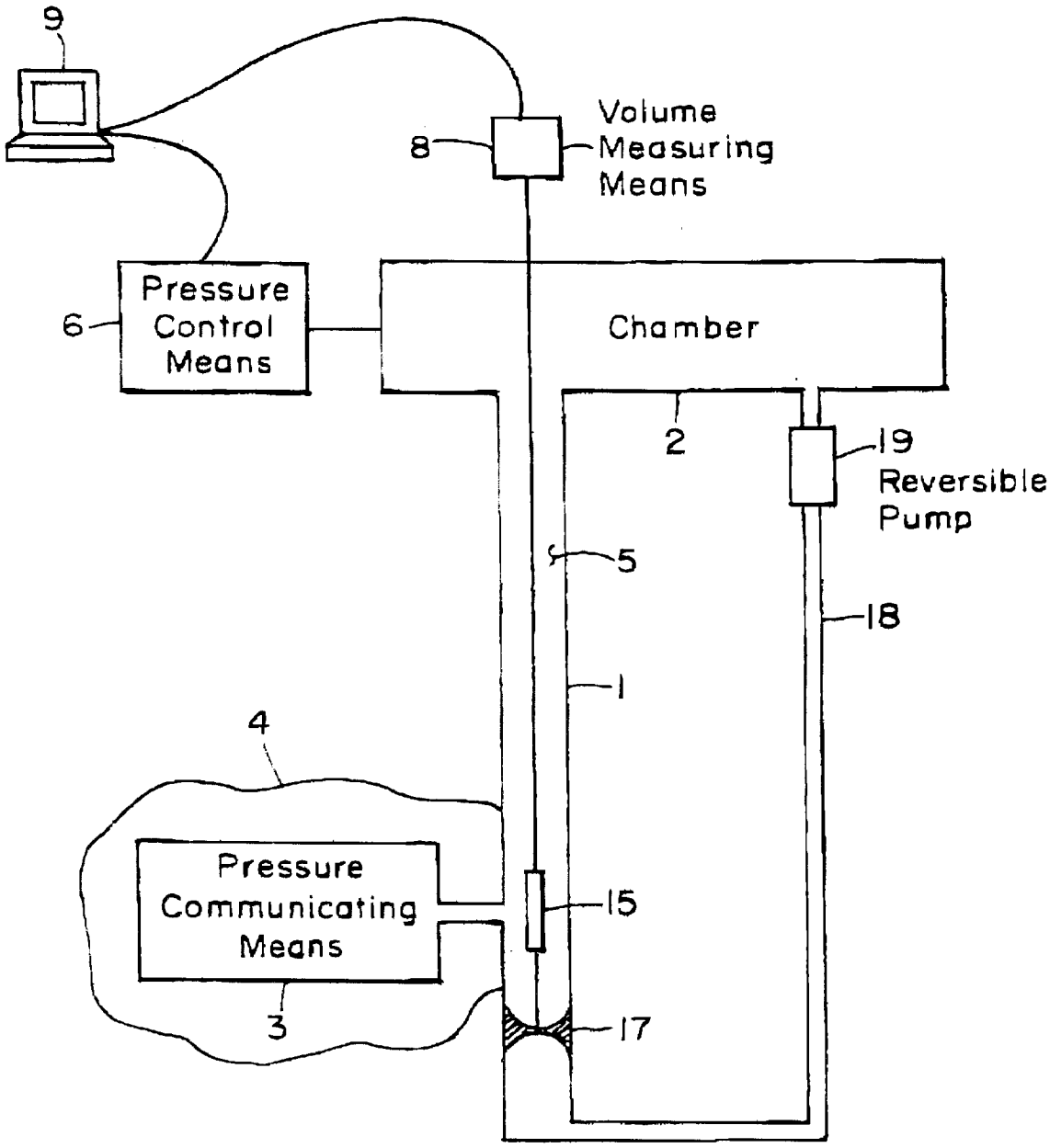
FIG. 5 is a diagram of a preferred embodiment of the present invention, in which a secondary tube is included.

In many uses of the present invention, it will be desirable to provide additional means of inserting and retrieving the pressure sensing means 15 shown in FIG. 4. Such means are provided in a preferred embodiment as shown in FIG. 5. The pressure sensing means 15 is attached to a piston 17 which is of a size and shape to create a significant obstruction to flow of the hydraulic oil 5 past the piston 17 so that piston 17 moves with the flow. A secondary tube 18 is provided which connects the end of the primary tube 1 to the chamber 2. A reversible pump 19 is used to cause a flow in either direction around the circuit made up of chamber 2, the primary tube 1, and secondary tube 18. The piston 17 will be carried by the flow and hence will insert or retrieve the pressure sensing means 15 according to the direction of the flow as determined by the pump 19.

Figure 6:
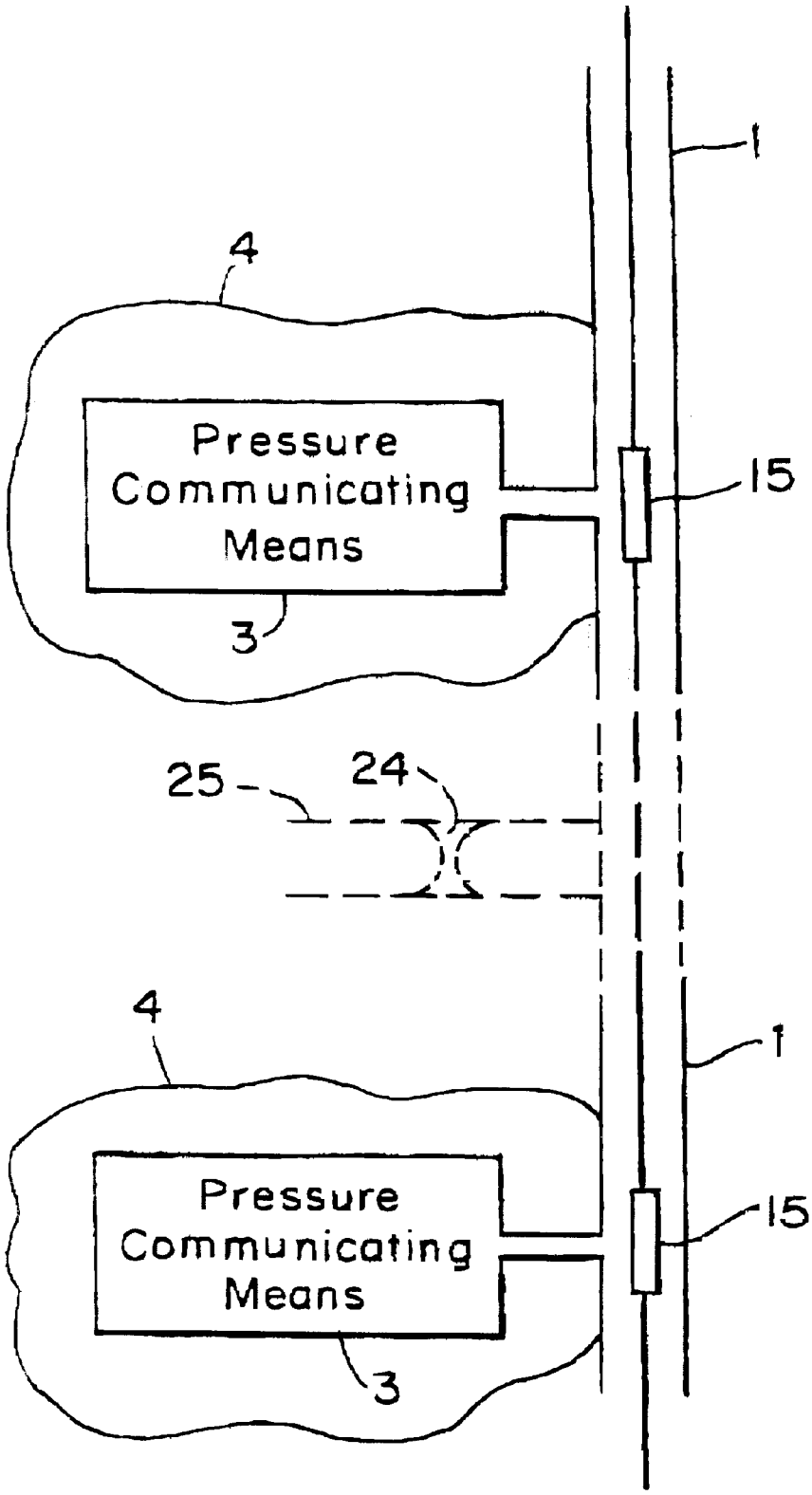
FIG. 6 is a diagram of part of a preferred embodiment of the present invention in which more than one pressure communicating means and more than one pressure sensor are included.

FIG. 6 illustrates part of another preferred embodiment of the present invention, in which more than one pressure communicating means 3 is provided so that the pressure at several different regions 4 may be measured according to the present invention. The volume changes within the different pressure communicating means 3, as they change from their OFF states to their ON states, may be the same as, or different, from each other. In addition, a single pressure sensing means 15, or one adjacent to each pressure communicating means, may be provided.

In another embodiment, several pressure communicating means 3, each with different characteristics, are provided adjacent to each other such that they all measure the same region 4.

Figure 7:
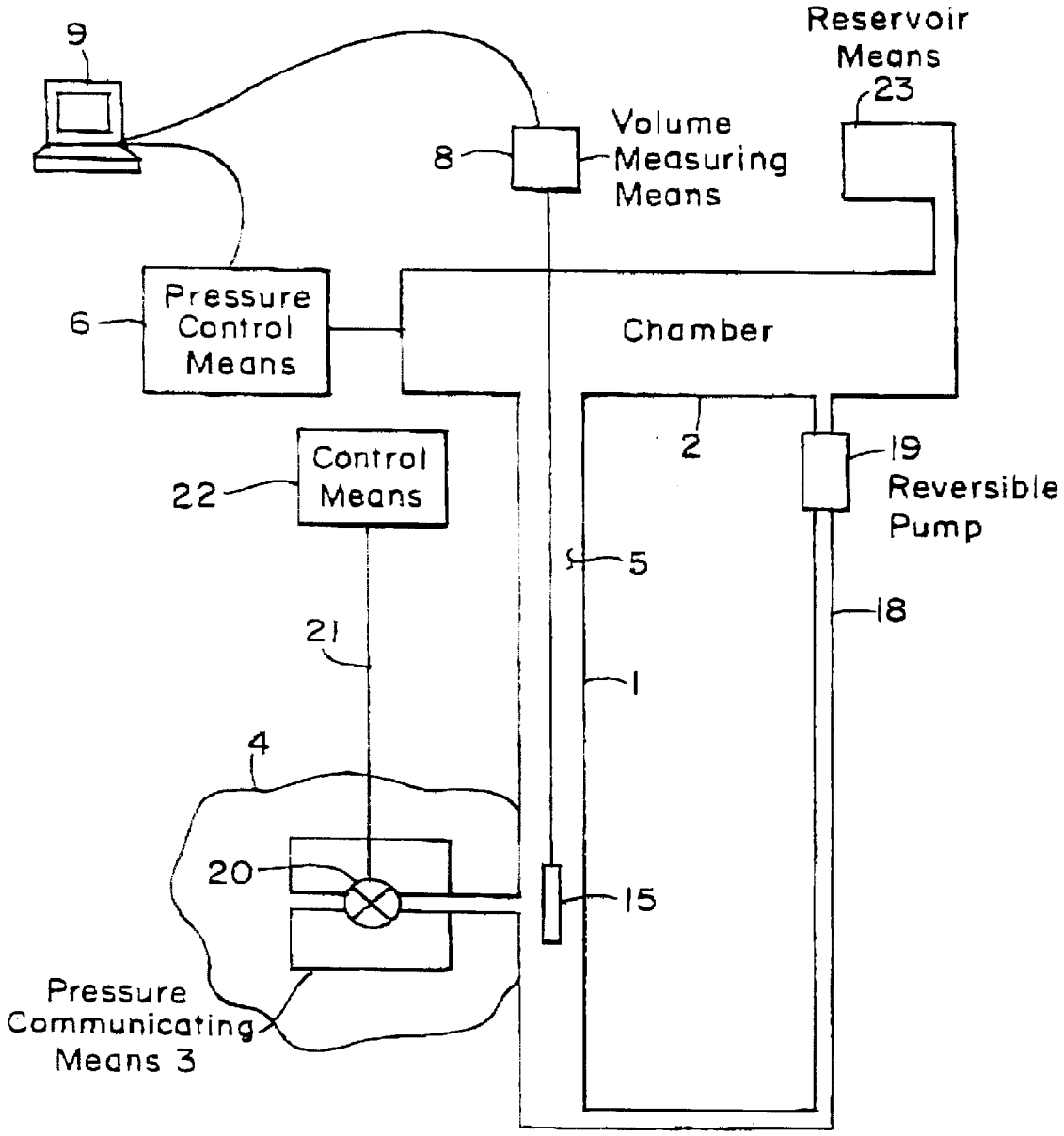
FIG. 7 is a diagram of a preferred embodiment of the present invention in which the pressure communicating means is switched by switch means.

FIG. 7 illustrates another preferred embodiment of the present invention in which the pressure communicating means 3 is switched between the ACTIVE state and the ON/OFF state by a slide or rotary valve 20, a separate hydraulic or electric line 21 and hydraulic or electric control means 22. In this embodiment, there is no mechanical interface, such as the membrane 10 shown in FIG. 2, between the fluid 5 in the primary tube 1 and the fluid in the region 4 to be measured, when pressure communicating means 3 is in the ACTIVE state. Thus it would not be necessary to take into account the properties of the mechanical interface, such as the membrane 10 shown in FIG. 2.

In the embodiment shown in FIG. 7, it is desirable to prevent fluid from region 4 entering primary tube 1, and it may also be desirable to flow fluid 5 through pressure communicating means 3 into region 4. Accordingly, reservoir means 23 may be provided in order to supply the volume of fluid 5 needed to compensate for the flow through pressure communicating means 3.

If desired, the pressure control means 6 may be an arrangement in which a force acts on a piston 24 inside a cylinder 25 containing the primary tube fluid 5, see FIG. 6.

I claim:

1. Apparatus for measuring pressure, which apparatus comprises pressure communicating means for location at a point at which pressure is to be measured, a primary tube containing a fluid for linking the pressure communicating means to a control point where [the] pressure information is required, sealing means for sealing the primary tube so as to form a closed system when the pressure communicating means is closed, pressure control means for changing the pressure of the fluid within the primary tube, volume measuring means for measuring changes in the volume of the fluid within the primary tube as the pressure of the fluid is varied, pressure measuring means for measuring the pressure of the fluid at some point within the fluid and remote from the control point, and transmitter means for transmitting pressure information from the pressure measuring means to the control point.

2. Apparatus according to claim 1 in which the primary tube is narrow bore hydraulic tubing whose change in dimension with pressure is either small or well-known.

3. Apparatus according to claim 1 in which the fluid in the primary tube is a hydraulic oil.

4. Apparatus according to claim 1 in which the pressure control means is such as to permit the pressure to be changed from one value to another under an external control.

5. Apparatus according to claim 4 in which the pressure control means is an arrangement in which a force acts on a piston inside a cylinder containing the primary tube fluid.

6. Apparatus according to claim 1 in which the pressure measuring means is a pressure transducer.

7. Apparatus according to claim 1 in which the pressure control means, the volume measuring means and an additional pressure measuring means are all located together at the control point.

8. Apparatus according to claim 1 and including temperature measuring means for measuring the temperature along the length of the primary tube.

9. Apparatus according to claim 8 in which the temperature measuring means is an optical fiber distributed temperature sensor, either outside or inside the primary tube.

10. Apparatus according to claim 1 in which the pressure measuring means is a pressure sensing means which is of such a dimension and structure that it is placeable inside the primary tube.

11. Apparatus according to claim 10 and including locating means for locating the pressure sensing means at a desired point within the primary tube.

12. Apparatus according to claim [1] *10* and including means for removing the pressure sensing means.

13. Apparatus according to claim 10 and including a secondary tube which connects the furthest point at which the pressure sensing means may be located in the primary tube to the control point, so that a return path for the fluid in the primary tube is provided.

14. Apparatus according to claim 13 in which the pressure sensing means is located by means of controlling the flow of fluid through the primary and secondary tubes.

15. Apparatus according to claim 14 in which the means of controlling the flow of fluid through the primary and secondary tubes is a pump with a capability of reversible flow.

16. Apparatus according to claim 1 in which the transmitter means are optical fibers.

17. Apparatus according to claim 1 in which the pressure sensing means is a passive optical fiber sensor.

18. Apparatus according to claim 1 in which the pressure sensing means is a polarimetric interferometer optical fiber pressure and temperature sensor.

19. Apparatus according to claim 1 and including additional pressure communicating means connected at different points along the primary tube, and means of distinguishing which pressure communicating means is in which state when the pressure is changed.

20. Apparatus according to claim 15 in which the pressure measuring means is a plurality of pressure sensing means, *and in which the pressure communicating means is a plurality of pressure communicating means,* and in which at least one of the pressure sensing means is located at each pressure communicating means so that it is not necessary to take into account the position of the pressure communicating means by computing a correction.

21. Apparatus according to claim 1 and including additional pressure communicating means.

22. Apparatus according to claim 1 in which the pressure communicating means is switched between the ACTIVE state and the ON/OFF state by separate means than the pressure in the primary tube.

23. Apparatus according to claim 22 in which the pressure communicating means is switched between the ACTIVE state and the ON/OFF state using a slide or rotary valve, a separate hydraulic or electric line, and hydraulic or electric control means.

24. Apparatus according to claim 22 in which there is no mechanical interface between the fluid in the primary tube and the point at which pressure is to be measured, when the pressure communicating means is in the ACTIVE state.

25. Apparatus according to claim 24 and including reservoir means for supplying fluid that may be lost through the pressure communicating means.

26. Apparatus according to claim 1 and including a reference pressure sensor for calibrating the apparatus.

*27. A method for sensing at least one physical parameter existing at one or more points which are at a remote location, comprising:*

*providing at least one sensor, the at least one sensor being in physical sensing communication with a cable, the at least one sensor being capable of sensing at least one physical parameter;*

*passing at least portions of the cable along a primary tube;*

*flowing fluid along the primary tube and cable to move the at least one sensor to at least one of the points; and*

*sensing sensor information from the at least one sensor.*

*28. A method according to claim 27 and further defined by communicating sensor information along at least one optical fiber forming at least part of the cable.*

*29. A method according to claim 27 and further defined by flowing fluid along a secondary tube in fluid communication with the primary tube to remove the at least one sensor from the primary tube.*

*30. A method according to claim 29 and further defined by flowing fluid through the primary tube in a first direction to move the at least one sensor to at least one of the points, and flowing fluid through the primary tube in a second direction opposite the first direction to remove the at least one sensor from the primary tube.*

*31. A method according to claim 27 and further defined by providing the sensor information to a control point via the cable.*

*32. A method according to claim 27, and wherein at least one sensor is a pressure sensor, and wherein the method is further defined by providing a pressure communicating means to communicate pressure from at least one of the points to the pressure sensor.*

*33. A method according to claim 27 and further defined by measuring temperature along the primary tube.*

*34. A method according to claim 33, and wherein the temperature is measured along the primary tube using an optical fiber temperature sensor.*

* * * * *